No. 746,699. Patented December 15, 1903.

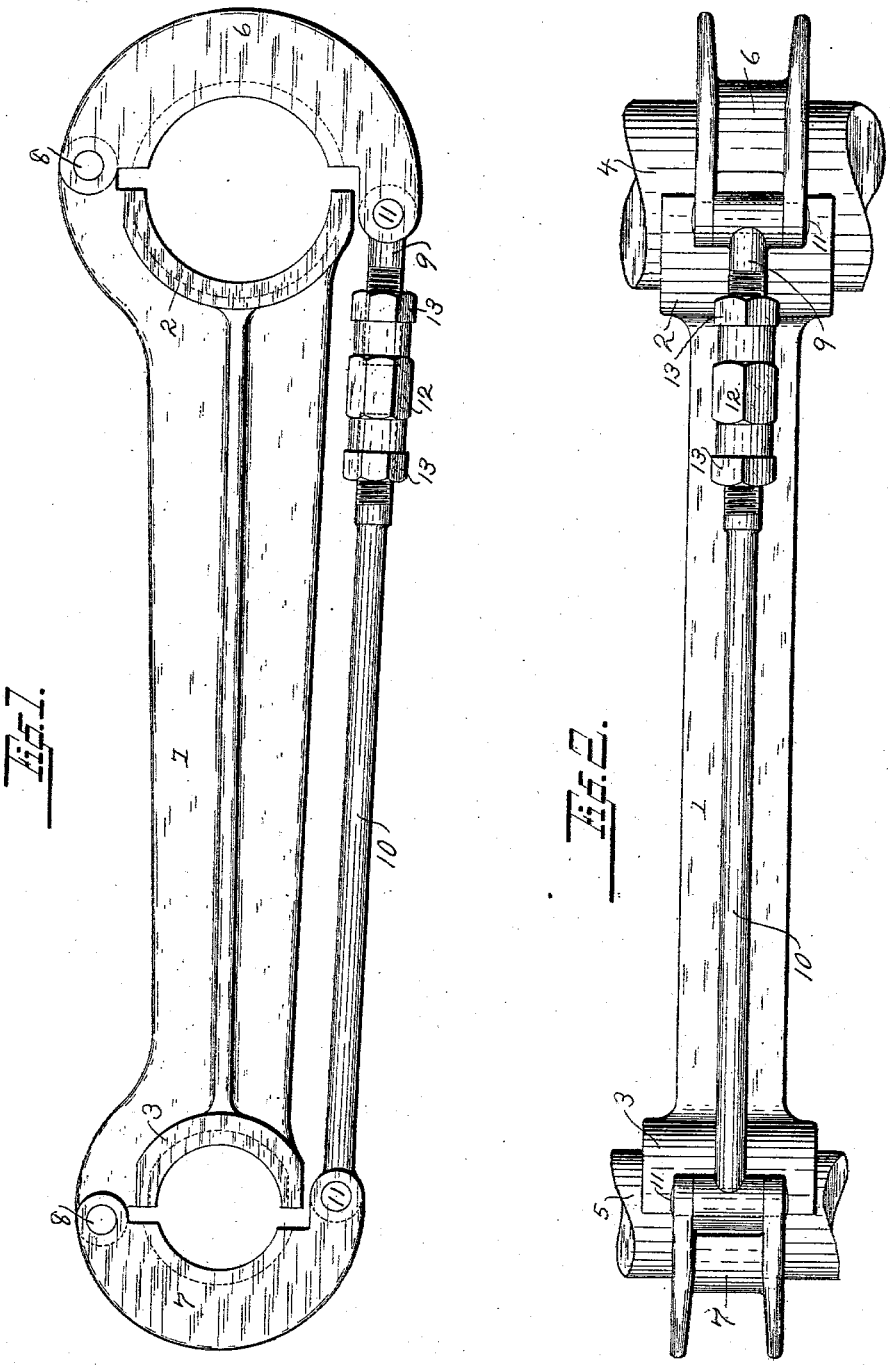

UNITED STATES PATENT OFFICE.

CHARLES W. HART, OF CHARLES CITY, IOWA.

CONNECTING-ROD.

SPECIFICATION forming part of Letters Patent No. 746,699, dated December 15, 1903.

Application filed May 15, 1903. Serial No. 157,221. (No model.)

*To all whom it may concern:*

Be it known that I, CHARLES W. HART, a citizen of the United States, residing at Charles City, county of Floyd, and State of Iowa, have invented new and useful Improvements in Connecting-Rods, of which the following is a specification.

My invention relates to improvements in connecting-rods for internal-combustion engines. In such engines the piston usually has the general form of an open-ended cylinder into which the connecting-rod extends and is secured by a cross-pin fitting suitable sockets or apertures in the wall of the piston or in projections therefrom. The connecting-rods heretofore in general use have been similar in construction to those used in steam-engines, no account being taken of the differences of strain or pressure between the out and in strokes of internal-combustion engines and consequent excess of wear on the outer half of the coupling-bearings and no regard being had for the difficulty of securing an accurate adjustment of the piston-pin bearings at the inner end of the connecting-rod, which rod extends for some distance into the piston-cavity. In some instances constructions have been devised with a view to overcoming the objections incident to the use of said ordinary form of connecting-rod; but such constructions have for various reasons been found impractical, and the same have been generally discarded.

The object of this invention is to provide practical and efficient means for securing an equal and delicate adjustment of the connecting-rod coupling-bearings at both ends and from a point exterior to the piston; also, to provide adequate means for locking the parts in any desired position of adjustment.

In the following description reference is had to the accompanying drawings, in which—

Figure 1 is a side view of the invention. Fig. 2 is a view drawn at right angles to that of Fig. 1 and showing the link connections between the movable coupling members.

Like parts are identified by the same reference characters in both views.

1 is the main bar of the connecting-rod.

2 and 3 are the fixed members of the crank and piston-pin couplings, respectively.

4 is a portion of the crank-pin, and 5 a portion of the piston-pin. These parts may be of any ordinary construction.

The adjustable coupling members or caps 6 and 7 are hinged at one side to the corresponding fixed members, as indicated at 8 in Fig. 1, and at the other side they are connected to each other by an adjustable link-rod formed in sections 9 and 10 and attached to the members 6 and 7, respectively, by pivot-pins 11, located at right angles to the line of strain and parallel with the piston and crank-pins. The sections of the link are connected by a right and left threaded link-nut 12 with two lock-nuts 13 on the screw-threaded ends of the respective link-sections 9 and 10, whereby no change of adjustment can take place without simultaneous retraction of both lock-nuts.

The section 9 of the link which is connected with the cap 6 at the crank-pin end is shorter than the section 10, thus locating the link-nut 12 outside of the piston, where it can be easily reached for readjustment at any time. With the described construction it will be observed that an adjustment of the single link-nut will be effective to tighten the bearings of both couplings with equal tension.

Having thus described my invention, what I claim as new, and desire to secure by Letters Patent, is—

1. A connecting-rod, having end bearing members, and hinged caps, coöperative with said bearing members to form couplings; and an adjustable link connection extending along one side of the rod and pivotally secured to the caps on the side opposite the cap-hinges.

2. A connecting-rod, having end bearing members; adjustable end caps, coöperative with said bearing members to form couplings; a link connection between said caps, comprising sections pivoted to the caps and connected with each other by a link-nut, operative upon right and left screw-threaded section ends to connect the sections and adjust the caps.

3. A connecting-rod, having end bearing members; adjustable end caps, coöperative with said bearing members to form couplings; a link connection between said caps, comprising sections pivoted to the caps and connected with each other by a link-nut, operative upon right and left screw-threaded section ends to connect the sections and adjust the caps; and lock-nuts, adjustable upon the screw-threaded ends of the respective sections to hold the link-nut in position.

4. The combination with the adjustable coupling members of a connecting-rod; of a link formed in sections, each connected with one of said coupling members; a link-nut having right and left screw-threaded connection with the inner ends of the respective link-sections; and means for locking the link-nut in position.

5. The combination with a connecting-rod, having sectional coupling-bearings at each end; of an adjusting-link parallel with the rod, and connected with one coupling member at each end; and intermediate means for adjusting the link.

6. The combination with a connecting-rod, having sectional coupling-bearings at each end; of an adjusting-link parallel with the rod and pivotally connected with one coupling member at each end; and intermediate means for adjusting the link.

In testimony whereof I affix my signature in the presence of two witnesses.

CHARLES W. HART.

Witnesses:
ETHEL HICKCOX,
M. E. ARKILLS.